United States Patent
Sathyanarayana et al.

(10) Patent No.: US 10,830,619 B2
(45) Date of Patent: *Nov. 10, 2020

(54) ENVELOPE BASED SAMPLE CORRECTION FOR DIGITAL FLOW METROLOGY

(71) Applicant: TEXAS INSTRUMENTS INCORPORATED, Dallas, TX (US)

(72) Inventors: Amardeep Sathyanarayana, Austin, TX (US); Anand G. Dabak, Plano, TX (US); David Patrick Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 357 days.

This patent is subject to a terminal disclaimer.

(21) Appl. No.: 14/866,779

(22) Filed: Sep. 25, 2015

(65) Prior Publication Data
US 2016/0334250 A1 Nov. 17, 2016

Related U.S. Application Data

(60) Provisional application No. 62/160,324, filed on May 12, 2015.

(51) Int. Cl.
*G01F 1/66* (2006.01)
(52) U.S. Cl.
CPC .................. *G01F 1/662* (2013.01)
(58) Field of Classification Search
CPC ..................................................... G01F 1/662
See application file for complete search history.

(56) References Cited

U.S. PATENT DOCUMENTS

| | | | | |
|---|---|---|---|---|
| 4,308,754 A | * | 1/1982 | Pedersen ................. | G01P 5/247 702/48 |
| 4,509,372 A | * | 4/1985 | Mount ..................... | G01F 1/668 73/861.28 |
| 4,633,719 A | * | 1/1987 | Vander Heyden ...... | G01F 1/667 73/861.28 |
| 4,787,252 A | * | 11/1988 | Jacobson ................. | G01F 1/66 73/861.28 |
| 5,650,571 A | * | 7/1997 | Freud ...................... | G01F 1/667 73/861.06 |
| 2004/0107779 A1 | * | 6/2004 | Kishimoto ............. | G01F 1/667 73/861.29 |

(Continued)

FOREIGN PATENT DOCUMENTS

CN 200910053264 * 12/2010 ............ G01F 1/66

*Primary Examiner* — Ajay Ojha
(74) *Attorney, Agent, or Firm* — Ebby Abraham; Charles A. Brill; Frank D. Cimino (57) ABSTRACT

In an embodiment, a system for measuring material flow in a pipe is disclosed. A first transducer is operable to transmit a first signal having a first frequency at a first time and receive a second signal at a second time, and a second transducer spaced apart from the first transducer and is operable to receive the first signal and transmit the second signal having the first frequency. A signal processing circuit communicatively coupled to the first transducer and the second transducer, the signal processing circuit is operable to determine a first envelope of the first signal and a second envelope of the second signal and calculate a flow rate based on the first envelope of the first signal and the second envelope of the second signal.

6 Claims, 7 Drawing Sheets

(56) References Cited

U.S. PATENT DOCUMENTS

| | | | |
|---|---|---|---|
| 2005/0209795 A1* | 9/2005 | Ao | G01F 1/667 |
| | | | 702/50 |
| 2008/0208056 A1* | 8/2008 | Kuhn | G01F 1/667 |
| | | | 600/449 |
| 2014/0107950 A1 | 4/2014 | Dabak et al. | |
| 2014/0303910 A1 | 10/2014 | Dabak et al. | |
| 2019/0136674 A1* | 5/2019 | Fripp | E21B 43/12 |

* cited by examiner

ENVELOPE BASED SAMPLE CORRECTION FOR DIGITAL FLOW METROLOGY

This application claims the benefit under 35 U.S.C. 119(c) of U.S. Provisional Application No. 62/160,324, filed May 12, 2015, which is incorporated by reference herein in its entirety.

CROSS-REFERENCES TO RELATED APPLICATIONS

This application claims the benefit under 35 U.S.C. 119(e) of U.S. Provisional Application No. 61/160,324 (TI-76062PS), filed May 12, 2015, which is incorporated by reference herein in its entirety.

BACKGROUND OF THE INVENTION

Embodiments of the present invention relate to analog-to-digital (ADC) sampling of ultrasonic signals to determine fluid velocity.

Ultrasound technology has been developed for measuring fluid velocity in a pipe of known dimensions. Typically, these measurement solutions use only analog processing and limit the accuracy and flexibility of the solution. Ultrasound velocity meters may be attached externally to pipes, or ultrasound transducers may be placed within the pipes. Fluid flow may be measured by multiplying fluid velocity by the interior area of the pipe. Cumulative fluid volume may be measured by integrating fluid flow over time.

Flow meter accuracy, however, may be compromised by turbulence, partially filled pipes, temperature variation, and numerous other factors. The present inventors have realized a need to improve measurement techniques in terms of cost and accuracy. Accordingly, the preferred embodiments described below are directed toward improving upon the prior art.

BRIEF SUMMARY OF THE INVENTION

In a preferred embodiment of the present invention, a method of calculating a time difference is disclosed. The method includes receiving a first signal, determining a first envelope of the first signal, and determining a first time the first envelope crosses a threshold. The method further includes receiving a second signal, determining a second envelope of the second signal, and determining a second time the second envelope crosses the threshold. The time difference is calculated between the first and second times.

DETAILED DESCRIPTION OF THE INVENTION

The preferred embodiments of the present invention provide significant advantages of ultrasonic differential time of flight ($\Delta$TOF) measurement techniques in a fluid or gas medium over methods of the prior art as will become evident from the following detailed description.

The present inventors have disclosed several improvements in digital time of flight measurement in previous patent applications. Application Ser. No. 14/051,623 (TI-72924), filed Oct. 11, 2013, discloses a method of band pass analog-to-digital sampling for fluid velocity measurement. Application Ser. No. 14/156,388 (TI-73699), filed Jan. 15, 2014, discloses an extended range analog-to-digital flow meter. Application Ser. No. 14/300,303 (TI-71551), filed Jun. 10, 2014, discloses further improvements to an extended range analog-to-digital flow meter. Each of these applications and the measurement methods they disclose are incorporated by reference herein in their entirety.

Figure 1:
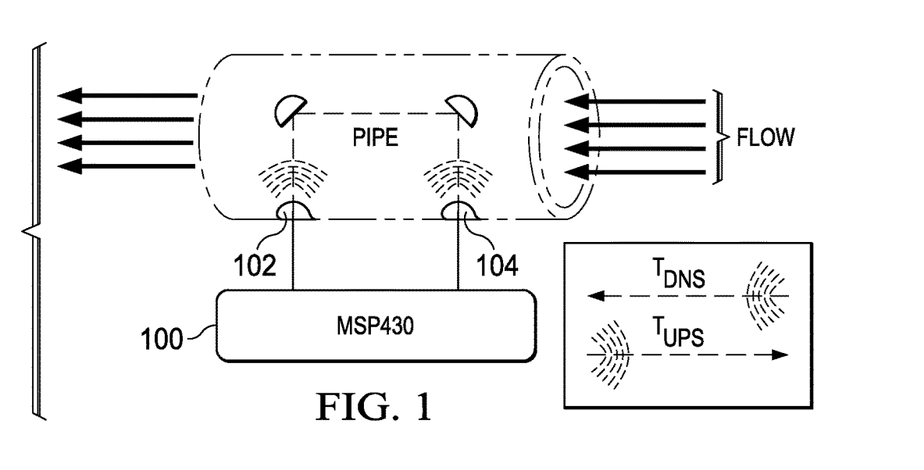
FIG. 1 is a simplified diagram of a pipe with ultrasonic transducers for fluid flow measurement according to the present invention.

Referring to FIG. 1, there is a simplified diagram of a pipe with ultrasonic transducers for fluid flow measurement according to the present invention. The diagram illustrates fluid such as a liquid or gas flowing from right to left through a pipe of known cross sectional area. Ultrasonic transducers 102 and 104 are attached to the pipe and separated by a distance L. Each ultrasonic transducer is coupled to a processor 100 such as the MSP430™ mixed-signal microcontroller manufactured by Texas Instruments Incorporated. The MSP430™ is built around a 16-bit CPU specifically for low cost and low power consumption embedded applications. Ultrasonic transducer 102 emits a sequence of preferably 10-40 pulses that are captured by ultrasonic transducer 104 to measure upstream time of flight ($T_{UPS}$). Ultrasonic transducer 104 subsequently emits a similar sequence of pulses that are captured by ultrasonic transducer 102 to measure downstream time of flight ($T_{DNS}$). Fluid velocity in the pipe is then calculated according to equations [1] through [3].

$$v = \frac{L}{2}\left(\frac{1}{T_{DNS}} - \frac{1}{T_{UPS}}\right) \quad [1]$$

$$v = \frac{L}{2}\left(\frac{T_{UPS} - T_{DNS}}{T_{UPS}T_{DNS}}\right) \quad [2]$$

$$v = \frac{L}{2}\left(\frac{\Delta TOF}{T_{UPS}T_{DNS}}\right) \quad [3]$$

Figure 2A:
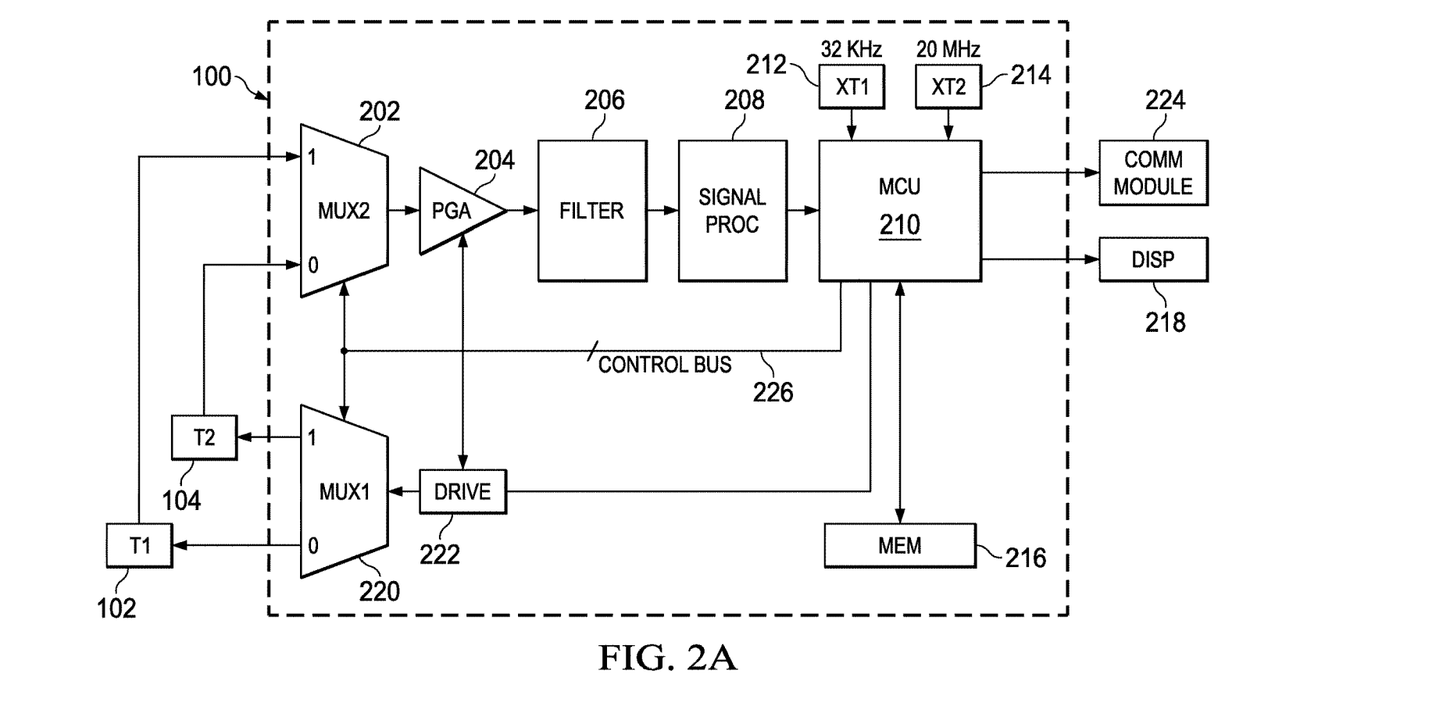
FIG. 2A is a circuit diagram of an ultrasonic measurement circuit of the present invention for measuring fluid flow.

Referring now to FIG. 2A, there is a circuit diagram of an ultrasonic measurement circuit of the present invention for measuring fluid flow. The circuit includes a processor 100 such as the MSP430™. The circuit further includes multiplex circuits 202 (MUX2) and 220 (MUX1) which are controlled by signals on control bus 226. MUX1 is coupled to receive an excitation signal from drive circuit 222 in response to micro control unit (MCU) 210. MCU 210 is coupled to memory circuit 216 and to display circuit 218. MCU 210 is also coupled to crystal oscillator circuit 212, which controls measurement times, and to crystal oscillator circuit 214, which controls excitation and sampling frequencies.

When a logical 0 from control bus 226 is applied to MUX1, the excitation signal from drive circuit 222 is applied to transducer T1. T1 responsively transmits an ultrasonic signal to transducer T2. T2 produces received upstream signal UPS, which is applied to MUX2. The logical 0 applied to MUX1 is also applied to MUX2 so that UPS is applied to programmable gain amplifier (PGA) 204. PGA 204 amplifies UPS and applies it to filter 206. The filtered signal is then applied to signal processing unit 208 to calculate UPS alignment points. Alternatively, when a logical 1 from control bus 226 is applied to MUX1, the excitation signal from drive circuit 222 is applied to T2. T2 responsively transmits an ultrasonic signal to T1. T1 produces received downstream signal DNS, which is applied to MUX2. The logical 1 applied to MUX1 is also applied to MUX2 so that DNS is applied to programmable gain amplifier (PGA) 204. PGA 204 amplifies DNS and applies it to filter 206. The filtered signal is then applied to signal processing unit 208 to determine respective DNS alignment points as will be described in detail. The MCU calculates the differential time of flight (ΔTOF) and fluid flow from the alignment points. The result is applied to communication module 224 and transmitted to a base station. The MCU also applies the result to display 218.

Figure 2B:
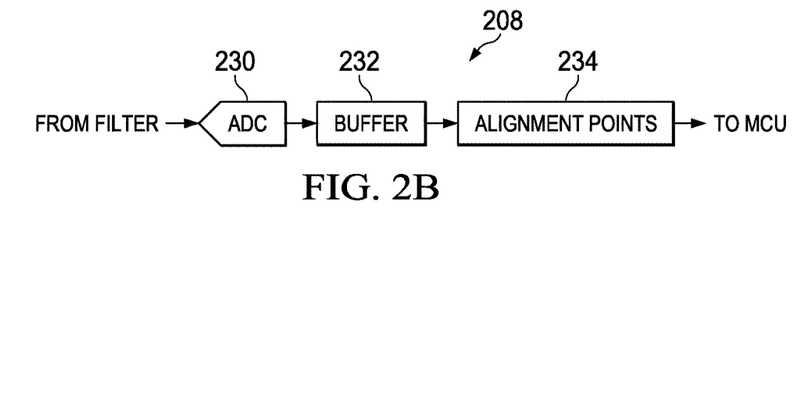
FIG. 2B is a circuit diagram showing detail of signal processing circuit 208 of FIG. 2A.

FIG. 2B is a circuit diagram showing detail of signal processing circuit 208 of FIG. 2A. The signal processing circuit alternately receives amplified and filtered ultrasonic signals from ultrasonic transducers T1 and T2. Analog-to-Digital Converter (ADC) 230 samples the received signals at a sampling frequency determined by MCU 210. The sampled signals are stored in buffer memory circuit 232. When sampled signals from both T1 and T2 are stored in buffer memory 232, circuit 234 calculates respective alignment points for each signal. Circuit 234 may be a digital signal processor, or any general purpose processor capable of real number calculations. Circuit 234 may also be a part of MCU 210 and may include both software and hardware. These alignment points are compared by MCU 210 to determine ΔTOF and fluid flow as will be explained in detail.

Figure 3:
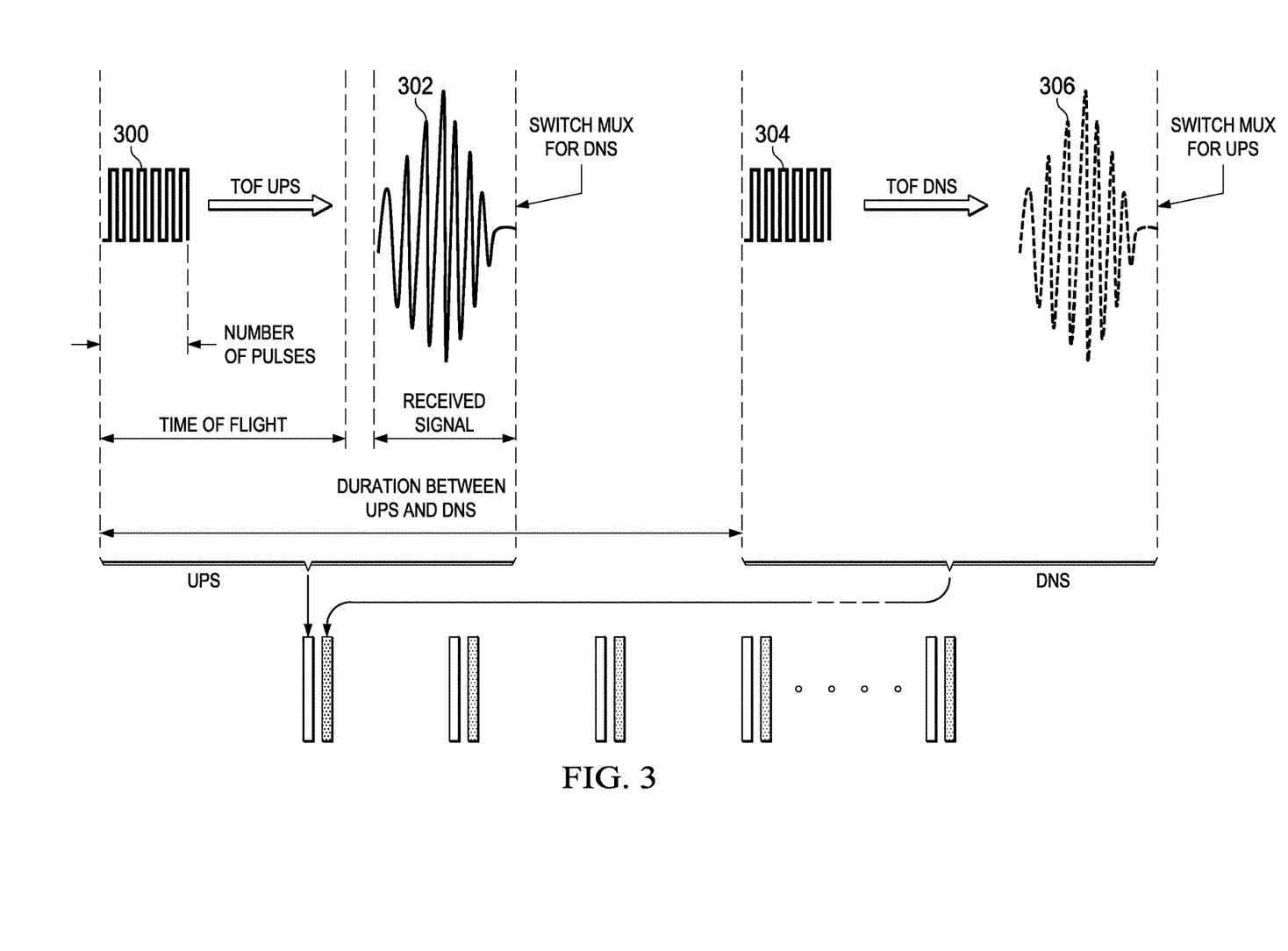
FIG. 3 is a diagram illustrating upstream (UPS) and downstream (DNS) time of flight (TOF) measurement of ultrasonic signals within a fluid such as a liquid or gas medium.

FIG. 3 is a diagram illustrating upstream (UPS) and downstream (DNS) time of flight (TOF) measurement of ultrasonic signals within a fluid medium. The diagram illustrates a sequence of pulse pairs from transducers T1 and T2 (FIG. 2). The left pulse pair is expanded to show the measurement process. The first UPS pulse 300 from transducer T1 arrives at MUX2 after an upstream time of flight has elapsed. The UPS pulse is received 302 and sampled alignment points are calculated. After alignment points are generated, MUX1 switches to apply a DNS pulse sequence 304 to transducer T2. MUX2 switches to receive the DNS pulse sequence from transducer T2. After a short delay to allow attenuation of noise and reflected signals, transducer T2 emits DNS pulse sequence 304. The DNS pulse is received 306 and sampled alignment points are calculated. After alignment points are generated, MUX1 and MUX2 switch to their previous states in preparation for the next pulse pair. In a preferred embodiment of the present invention, sampled alignment points of received waveforms 302 and 306 are generated first as described. Subsequent processing steps, such as filtering, envelope generation, threshold detection, and shifting are performed between pulse pairs to take advantage of the relatively greater processing time available. The delay between pulse pairs is determined by desired accuracy and power conservation. Moreover, the time between pulse pairs may be dynamically adapted to conserve power. For example, when fluid flow is reduced, the time between pulse pairs may be advantageously increased to conserve power. When a pulse pair measurement indicates an increase in fluid flow, the duration between pulse pairs may be appropriately reduced.

Figure 4:
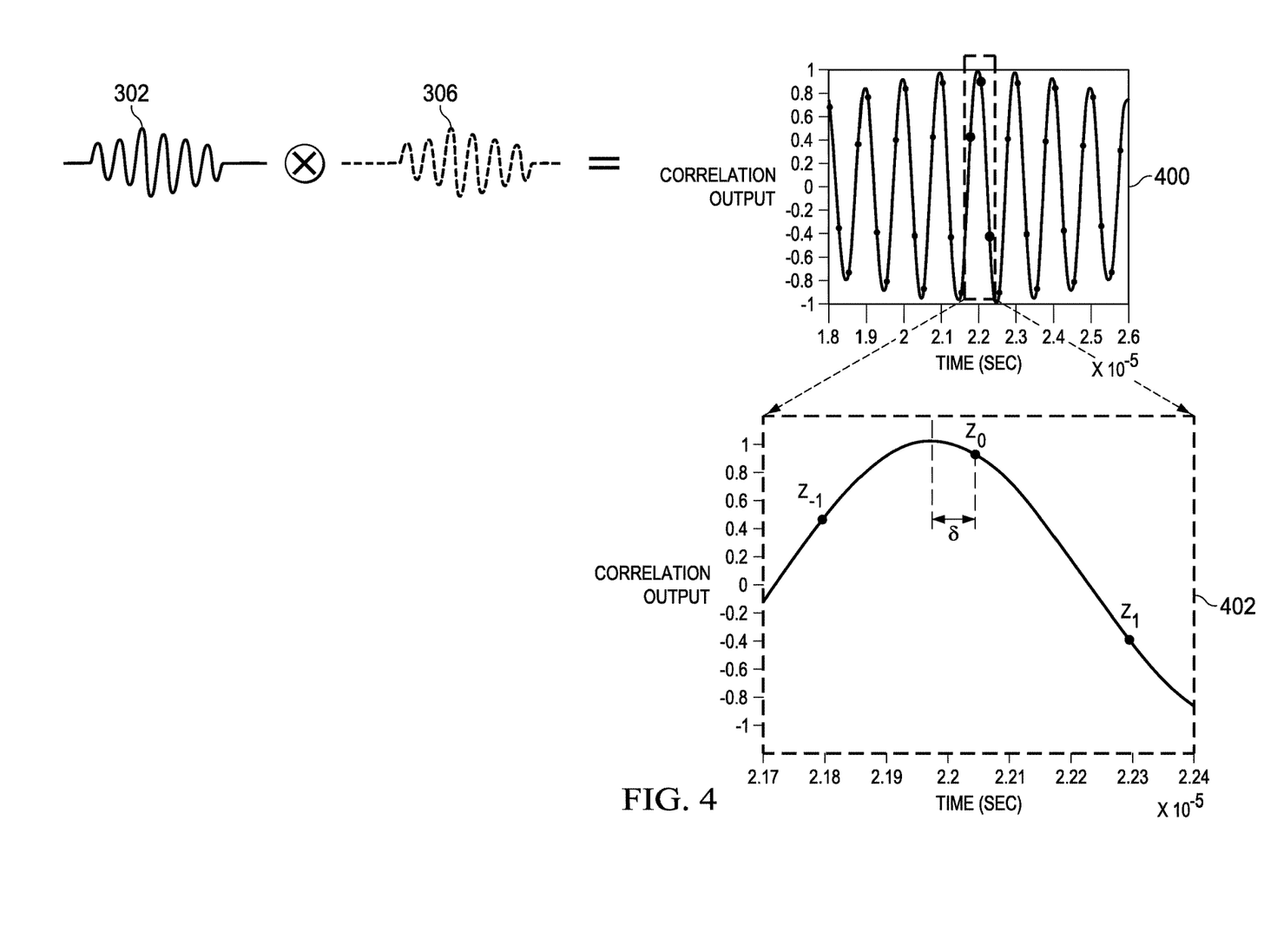
FIG. 4 is a diagram showing cross correlation of received upstream and downstream ultrasonic waveforms.

Turning now to FIG. 4, there is a diagram showing cross correlation of received upstream 302 and downstream 306 ultrasonic waveforms. Cross correlation is advantageously used to compute ΔTOF as shown at equations [4] through [6].

$$\text{corr}(k) = \sum_{i=1}^{N-k} r_1(i+k) r_2(i) \quad [4]$$

$$Z_n = \text{corr}(j-n) \quad [5]$$

$$n = (-1, 0, 1) \quad [6]$$

Here $r_1$ and $r_2$ are alignment points of respective UPS 302 and DNS 306 signals. The term j-n of equation [5] is equivalent to k in equation [4] and Zn indicates the cross correlation product of alignment points. The cross correlation product produces a set of sinusoidal points 400 with a maximum value near the center. The maximum value at the center is expanded in box 402 and includes $Z_{-1}$, $Z_0$, and $Z_{+1}$. The cross correlation technique accounts for sample slips within a cycle by ensuring $Z_0$ is greater than $Z_{-1}$ and $Z_{+1}$. If $Z_0$ is not greater than either of $Z_{-1}$ or $Z_{+1}$, index n may be incremented or decremented until the condition is satisfied. Cross correlation point $Z_0$ is then near the correct maximum alignment of UPS 302 and DNS 306 with an error δ. This error is preferably resolved by cosine interpolation as shown by equations [7] through [9].

$$\omega = \cos^{-1}((Z_{-1}+Z_1)/(2Z_0)) \quad [7]$$

$$\phi = \tan^{-1}((Z_{-1}-Z_1)/(2Z_0 \sin(\omega))) \quad [8]$$

$$\delta = -\phi/\omega \quad [9]$$

The foregoing cross correlation technique with δ adjustment corrects for alignment point or sample slip errors within a cycle. This accurately predicts ΔTOF between UPS and DNS for most flow rates. However, at high flow rates the ΔTOF error may be greater than a cycle. Such an error of one or more cycles is a cycle slip and may not be corrected by cross correlation. The flow chart of FIG. 5 chart shows a method of fluid flow measurement according to the present invention to correct for both cycle slip and sample slip errors. The method is explained below with reference to FIGS. 6-8.

Figure 5:
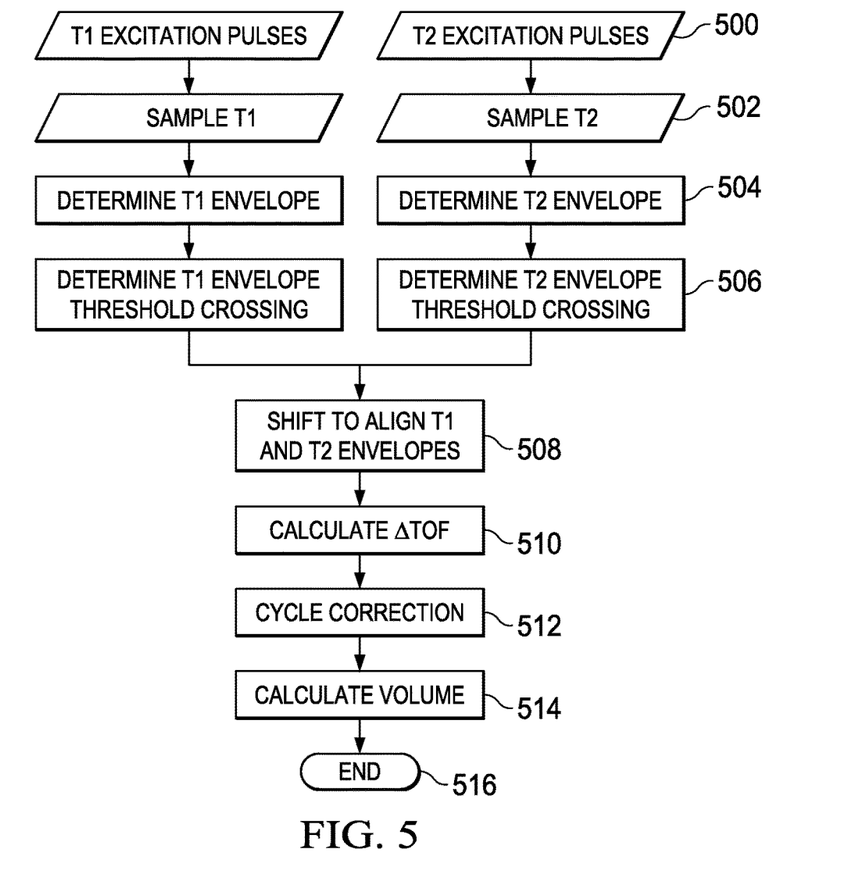
FIG. 5 is a flow chart showing a method of fluid flow measurement according to the present invention.

The flow chart of FIG. 5 includes left and right branches for respective UPS and DNS extraction. Both branches operate in the same manner except that the left branch is responsive to UPS excitation pulses from transducer T1, and the right branch is responsive to DNS excitation pulses from transducer T2. Operation of only the right branch, therefore, is explained in detail with reference to actual captured UPS and DNS waveforms of FIGS. 6-8.

Figure 6:
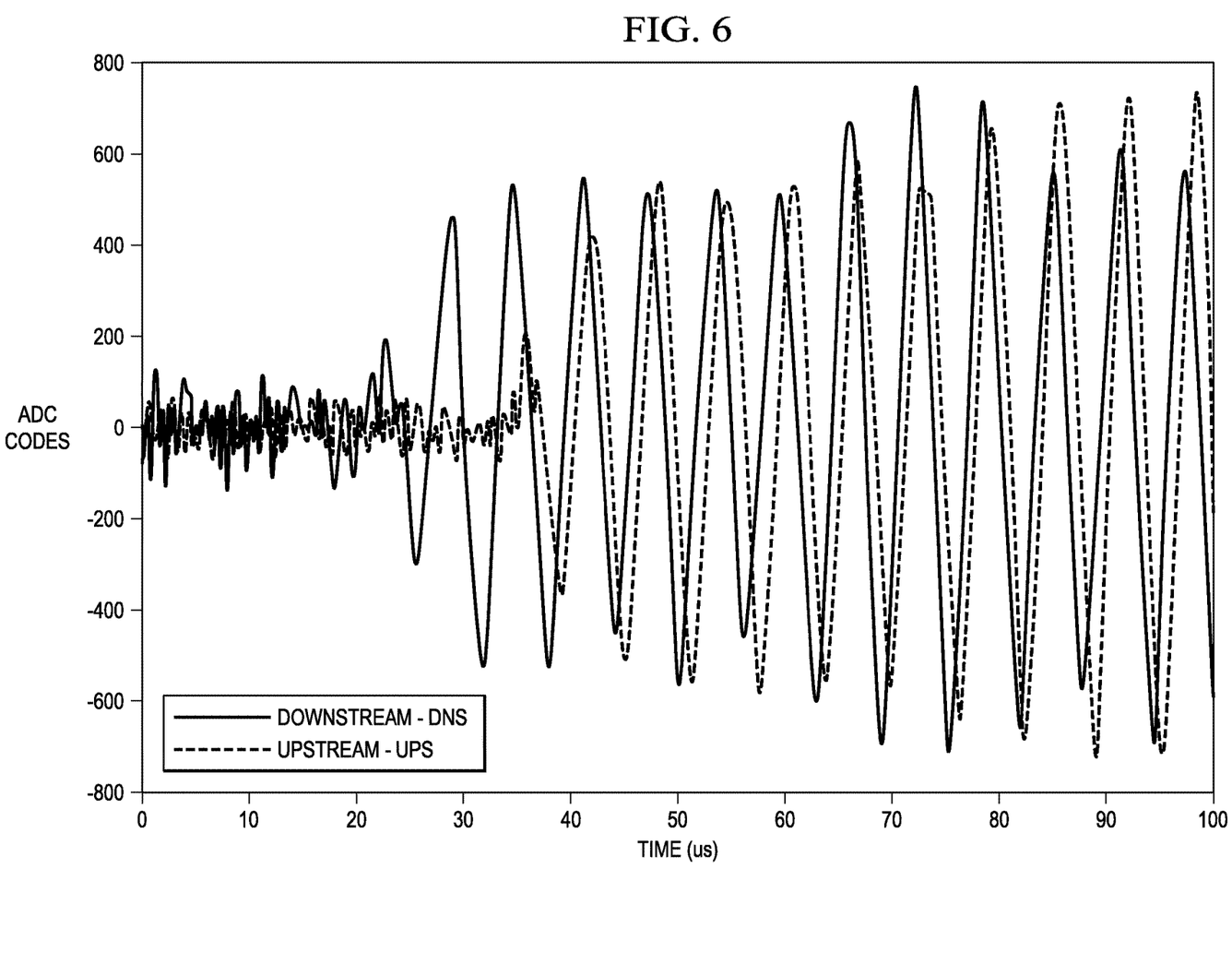
FIG. 6 is diagram of a received downstream (DNS) ultrasonic waveform superimposed on a received upstream (UPS) ultrasonic waveform.

DNS excitation pulses from transducer T2 are received at step 500. In the following example of the present invention, transducer T2 is excited at 160 KHz. The period of each cycle, therefore, is 6.25 μs. The waveforms of FIG. 6 show that the downstream (DNS) waveform leads the upstream (UPS) waveform by approximately two cycles. At step 502, the captured DNS signal is sampled at 4 MSPS. Each cycle, therefore, has 25 samples. To obtain a close estimate of the number of offset cycles and samples between the DNS and UPS waveforms, the sample data is band pass filtered near the excitation frequency. In this example, an appropriate pass band is approximately 140 KHz to 180 KHz.

Figure 7:
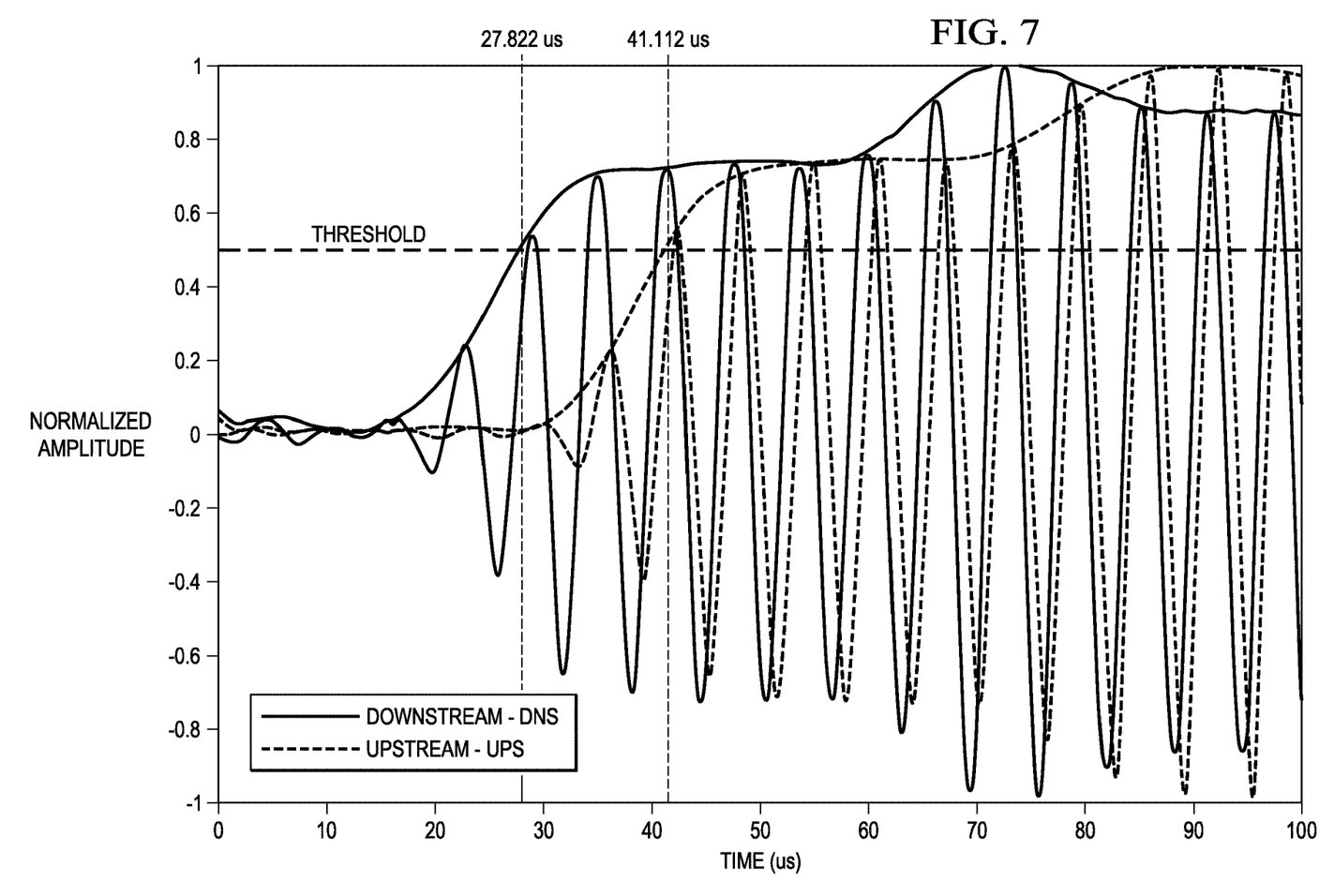
FIG. 7 is a diagram showing envelopes of the received DNS and UPS ultrasonic waveforms of FIG. 6.

At step 504 the DNS envelope is determined. There are various methods to determine an envelope of the sampled signal. One method uses a Hilbert FIR filter to obtain an analytic signal which can be used to calculate the envelope as disclosed by Romero et al., *Digital FIR Hilbert Transformers: Fundamentals and Efficient Design Methods*, http://cdn.intechopen.com/pdfs-wm/39362.pdf, (2012), the method of which is incorporated by reference herein in its entirety. The envelope may also be determined by taking the square of the band pass filter output, low pass filtering the square, and taking the square root. At http://www.mathworks.com/help/dsp/examples/envelope-detection.html, both methods are disclosed and incorporated herein by reference in their entirety. Either method yields a close approximation to DNS and UPS envelopes. Both DNS and UPS envelopes are normalized to a range of +/1 as shown at FIG. 7. Normalization advantageously permits accurate determination of threshold crossing at step 506. In this example, a fixed threshold of 0.5 is used to approximate ΔTOF between DNS and UPS. Alternatively, an adaptive threshold may be employed that changes with flow rate and temperature. For other embodiments it may be desirable to utilize multiple thresholds to improve accuracy. Of course, the DNS and UPS threshold comparison may be on the rising or falling envelope edges or on the negative envelope edges.

Figure 8:
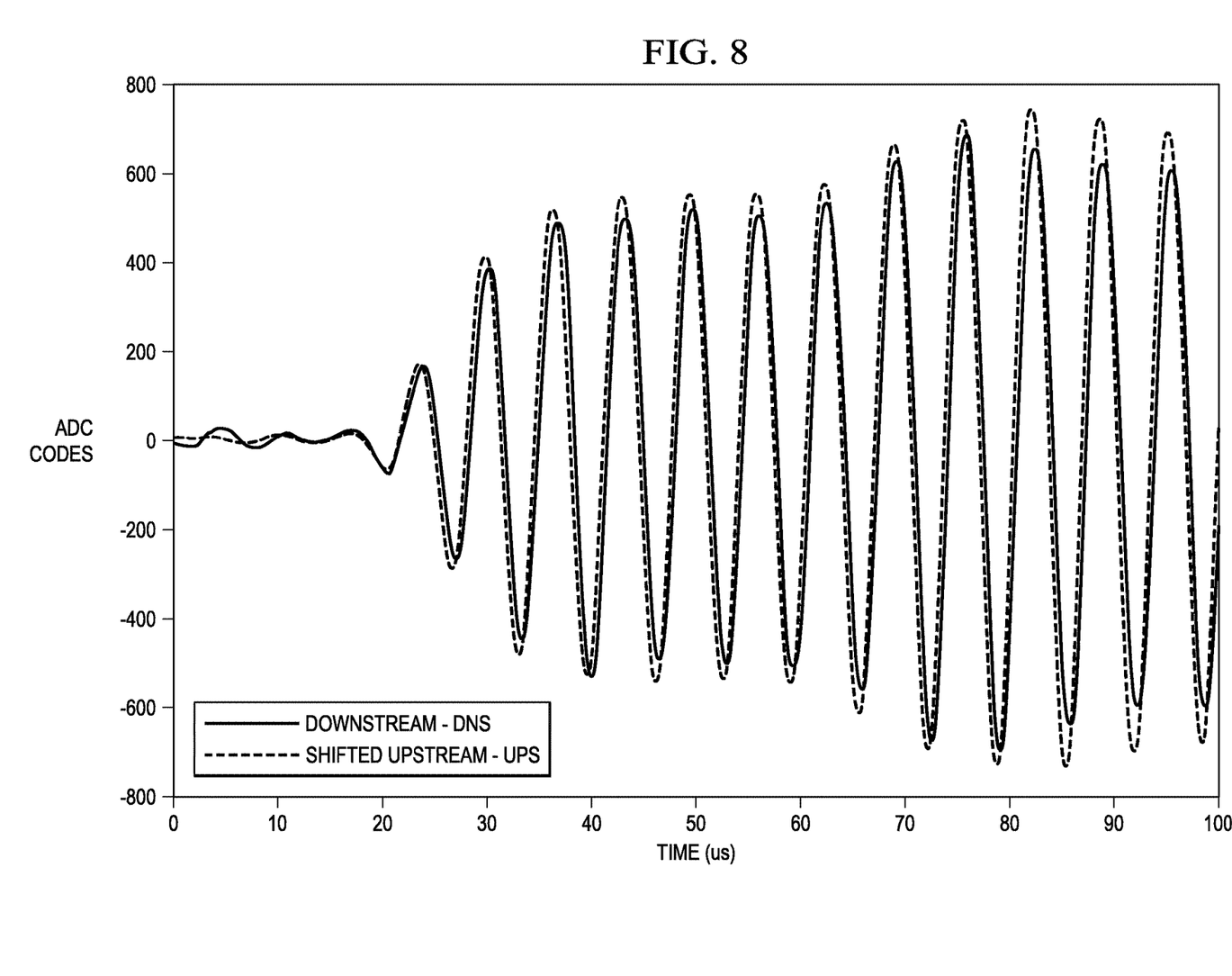
FIG. 8 is a diagram showing alignment of the received DNS and UPS ultrasonic waveforms after shifting in response to waveform envelope thresholds.

FIG. 7 shows that the DNS envelope crosses the 0.5 threshold at 27.822 μs. The UPS envelope crosses the 0.5 threshold at 41.112 μs and lags the DNS waveform by 13.29 μs. This is equivalent to 53.16 samples at 4 MSPS. Since the UPS waveform can only be shifted by an integral number of samples, it is shifted left by 53 samples at step 508 as shown at FIG. 8. This provides a close alignment of DNS and UPS that is within one cycle. Once DNS and UPS are within one cycle, three point cross correlation and cosine interpolation as previously described with reference to FIG. 4 are used at step 510 to compute δ. In this example, δ is 40.625 ns or 0.1625 of a sample time. Thus, the corrected ΔTOF is 53 plus 0.1625 samples or 13.25 μs plus 40.625 ns and is equal to 13.290625 μs.

In some borderline cases, there may be a one-cycle error when shifting the UPS waveform by an integral number of samples. Step 512 compensates for this possibility by comparing an absolute difference between the computed ΔTOF and the DNS/UPS envelope difference as shown at equation [10].

$$|\Delta T_{ENVELOPE} - \Delta TOF| > T_{CYCLE} \quad [10]$$

If the envelope difference between DNS and UPS ($\Delta T_{ENVELOPE}$) differs from the computed ΔTOF of step 510 by more than one cycle time ($T_{CYCLE}$), then ΔTOF is adjusted by +/− one cycle time. Finally, at step 514 fluid flow rate is computed as previously described at equation [3].

The present invention greatly improves previous methods of fluid metrology. Signal envelope variations are smaller than individual signal variations. Thus, comparing signal envelopes to known thresholds yields more stable and accurate measurements. Using the signal envelopes to determine signal offset compensates for both cycle and sample slip errors. Subsequent filtering of data near the transducer excitation frequency reduces noise and improves the signal-to-noise ratio for further processing. DNS and UPS threshold crossing times together with a δ error correction may be used directly for a ΔTOF calculation, thereby reducing additional computation and conserving power.

Still further, while numerous examples have thus been provided, one skilled in the art should recognize that various modifications, substitutions, or alterations may be made to the described embodiments while still falling within the inventive scope as defined by the following claims. For example, threshold crossing may be determined from an average of multiple thresholds. Alternatively, zero crossing or negative thresholds may be used. Although cosine interpolation has been described in a preferred embodiment of the present invention, other interpolation methods may also be used. Other combinations will be readily apparent to one of ordinary skill in the art having access to the instant specification.

The invention claimed is:

1. A system, comprising:
   a first transducer operable to transmit a first signal having a first frequency at a first time and receive a second signal at a second time;
   a second transducer spaced apart from the first transducer and operable to receive the first signal and transmit the second signal having the first frequency; and
   a signal processing circuit communicatively coupled to the first transducer and the second transducer, the signal processing circuit operable to:
      determine a first envelope of the first signal and a second envelope of the second signal;
      determine a first threshold crossing of the first envelope to an adaptive threshold;
      determine a second threshold crossing of the second envelope to the adaptive threshold;
      shifting the first envelope based in part on a time difference between the first threshold crossing and the second threshold crossing; and
      calculate a flow rate of a material based in part on the shifted first envelope and the second envelope.

2. The system of claim 1, wherein the adaptive threshold is adaptive to a temperature of the material.

3. The system of claim 1, wherein the first transducer is affixed to a pipe, and wherein the second transducer is spaced apart from the first transducer and affixed to the pipe.

4. The system of claim 1, wherein the signal processing circuit is further operable to receive the first signal and the second signal.

5. The system of claim 4, wherein the signal processing circuit comprises an analog-to-digital converter, the analog-to-digital converter is operable to sample the received first signal and the received second signal at a sampling frequency.

6. The system of claim 1, wherein the signal processing circuit comprises a buffer memory to store the sampled first signal and the sampled second signal.

* * * * *